United States Patent
Linster et al.

(10) Patent No.: US 7,351,763 B2
(45) Date of Patent: Apr. 1, 2008

(54) TIRE WITH TREAD OF RUBBER AND CARBON BLACK WITH SILICA DOMAINS ON ITS SURFACE PREPARED BY EXTENDED REACTIVE MIXING

(75) Inventors: Tom Dominique Linster, Gilsdorf (LU); Giorgio Agostini, Colmar-Berg (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 322 days.

(21) Appl. No.: 10/618,032

(22) Filed: Jul. 11, 2003

(65) Prior Publication Data

US 2004/0044114 A1    Mar. 4, 2004

Related U.S. Application Data

(60) Provisional application No. 60/406,268, filed on Aug. 27, 2002.

(51) Int. Cl.
*C08K 3/34*    (2006.01)
*C08F 2/44*    (2006.01)

(52) U.S. Cl. .................... 524/493; 524/495; 524/858; 524/862; 524/865; 525/105; 528/25

(58) Field of Classification Search ............... 524/493, 524/495, 858, 862, 865; 525/105; 528/25
See application file for complete search history.

(56) References Cited

U.S. PATENT DOCUMENTS

| | | | |
|---|---|---|---|
| 5,679,728 A | 10/1997 | Kawazura et al. | 523/215 |
| 5,830,930 A | 11/1998 | Mahmud et al. | 523/215 |
| 5,919,841 A | 7/1999 | Mahmud et al. | 523/351 |
| 5,948,835 A | 9/1999 | Mahmud et al. | 523/215 |
| 6,008,272 A | 12/1999 | Mahmud et al. | 523/351 |
| 6,013,718 A * | 1/2000 | Cabioch et al. | 524/506 |
| 6,028,137 A | 2/2000 | Mahmud et al. | 523/215 |
| 6,075,084 A * | 6/2000 | Mabry et al. | 524/495 |
| 6,090,880 A | 7/2000 | Zimmer et al. | 524/492 |
| 6,160,047 A | 12/2000 | Agostini et al. | 524/494 |
| 6,172,137 B1 | 1/2001 | Agostini et al. | 523/212 |
| 2001/0004648 A1 | 6/2001 | Agostini et al. | 523/212 |

FOREIGN PATENT DOCUMENTS

| | | |
|---|---|---|
| EP | 829511 | 3/1998 |
| EP | 1188786 | 3/2002 |
| WO | 9637546 | 11/1996 |

OTHER PUBLICATIONS

*Rubber World*, Apr. 2, 2002, p. 43.

* cited by examiner

*Primary Examiner*—Kriellion A Sanders
(74) *Attorney, Agent, or Firm*—Henry C. Young, Jr.

(57) ABSTRACT

A tire is provided having a circumferential tread of a diene-based rubber composition reinforced with a silica-containing carbon black which contains domains of silica on its surface prepared by extended reactive mixing of said silica-containing carbon black with a coupling agent together with at least one elastomer. Said silica-containing carbon black is a carbon black which contains silica domains on its surface and said silica contains hydroxyl groups (e.g. silanol groups) on its surface, wherein said silica domains cover at least 50 percent of the carbon black surface. Said coupling agent is a bis(3-triethoxysilylpropyl) polysulfide having an average of from 2 to 4, alternately a more limited average of from 2 to 3 or from 2 to 2.6, connecting sulfur atoms in its polysulfidic bridge. In one aspect of the invention, it is preferred that said coupling agent is exclusive of a bis(3-trialkoxysilylalkyl) polysulfide having an average of greater than 3.5 sulfur atoms in its polysulfidic bridge.

18 Claims, No Drawings

US 7,351,763 B2

TIRE WITH TREAD OF RUBBER AND CARBON BLACK WITH SILICA DOMAINS ON ITS SURFACE PREPARED BY EXTENDED REACTIVE MIXING

The Applicants hereby incorporate by reference prior U.S. Provisional Application Ser. No. 60/406,268, filed on Aug. 27, 2002.

FIELD OF THE INVENTION

A tire is provided having a circumferential tread of a diene-based rubber composition reinforced with a silica-containing carbon black which contains domains of silica on its surface prepared by extended reactive mixing of said silica-containing carbon black with a coupling agent together with at least one elastomer. Said silica-containing carbon black is a carbon black which contains silica domains on its surface and said silica contains hydroxyl groups (e.g. silanol groups) on its surface, wherein said silica domains cover at least 50 percent of the carbon black surface. Said coupling agent is a bis(3-triethoxysilypropyl) polysulfide having an average of from 2 to 4, alternately a more limited average of from 2 to 3 or from 2 to 2.6, connecting sulfur atoms in its polysulfidic bridge. In one aspect of the invention, it is preferred that said coupling agent is exclusive of a bis(3-trialkoxysilylalkyl) polysulfide having an average of greater than 3.5 sulfur atoms in its polysulfidic bridge.

BACKGROUND OF THE INVENTION

Tires are typically prepared of treads of elastomer based rubber compositions which are conventionally carbon black reinforced. Sometimes tire tread rubber compositions may also be reinforced with silica by utilizing a combination of individual silica and carbon black particles. Typically the silica is a precipitated silica.

Often coupling agents are used with precipitated silica to assist in its reinforcement of elastomers with which the silica is mixed. Utilization of silica couplers for such purpose is well known to those skilled in such art.

Historically, carbon black having domains of silica on its surface has been suggested for use as reinforcement of various diene-based elastomer compositions for tire treads. Such carbon black has been taught as being prepared, for example, by co-fuming carbon black and silica at an elevated temperature. For example, see U.S. Pat. Nos. 6,172,137, 6,160,047, 6,090,880 and 6,028,137 as well as *Rubber World*, Apr. 2, 2002, Page 43 et al.

However, for this invention, a tire tread rubber composition is prepared by reactive mixing of the carbon black having silica domains on its surface (with the silica domains having hydroxyl groups on their surface) and coupling agent together with at least one elastomer.

By the term "reactive mixing" it is meant that, in a non-productive mixing step, the rubber composition containing the silica and coupling agent, to the exclusion of addition of free sulfur and sulfur vulcanization accelerator(s), are mixed in an internal rubber mixer under high shear mixing conditions, in a pre-extended mixing phase to a suitable temperature followed by substantially maintaining such temperature while continue to mixing said silica-containing carbon black and silica to promote a continuing reaction between siloxy groups of said coupling agent and hydroxyl groups contained on said silica domains on the surface of said silica-containing carbon black and/or silica.

The term "non-productive" mixing step is conventionally used herein to relate to a mixing step for one or more diene-based elastomers with one or more ingredients without addition of free sulfur and sulfur vulcanization accelerator(s). Consequently, the term "productive" mixing is conventionally used herein to relate to a mixing step following said non-productive mixing step(s) in which free sulfur and one or more vulcanization accelerator(s) are mixed therewith. Such non-productive and productive mixing steps are well known to those having skill in such art.

In the description of this invention, the term "phr" where used herein, and according to conventional practice, refers to "parts of a respective material per 100 parts by weight of rubber, or elastomer".

In the description of this invention, the terms "rubber" and "elastomer" where used herein, are to be used interchangeably, unless otherwise prescribed. The terms "rubber composition", "compounded rubber" and "rubber compound", if used herein, are used interchangeably to refer to "rubber which has been blended or mixed with various ingredients and materials" and such terms are well known to those having skill in the rubber mixing or rubber compounding art. The terms vulcanize and cure where used therein are used interchangeably unless otherwise indicated.

SUMMARY AND PRACTICE OF THE INVENTION

In accordance with this invention, a process of preparing a rubber composition is comprised of at least one mixing step comprised of, based upon parts by weight per 100 parts by weight rubber (phr) mixing a rubber composition in an internal rubber mixer, wherein said rubber composition is comprised of, to the exclusion of addition of free sulfur and sulfur vulcanization accelerator(s):

(A) at least one diene-based elastomer,
(B) about 10 to about 200, alternately about 30 to about 100, phr of reinforcing filler composed of:
  (1) about 15 to about 100, alternately about 50 to about 100, and, if desired about 50 to about 95, weight percent of said filler as a composite of a silica-containing carbon black having silica domains on its surface wherein said silica domains contain hydroxyl groups (e.g. silanol groups) on their surface; and, optionally
  (2) from zero to about 85, alternately from zero to 50, and, if desired, about 5 to about 50, weight percent of at least one additional reinforcing filler as at least one of synthetic amorphous silica, preferably precipitated silica, which contains hydroxyl groups (e.g. silanol groups) on the surface thereof and non-silica containing rubber reinforcing carbon black, and
  (3) a coupling agent as a bis(3-triethoxysilylpropyl) polysulfide having an average of from 2 to 4, alternately an average of from 2 to 3 or of from 2 to 2.6, connecting sulfur atoms in its polysulfidic bridge, preferably to the exclusion of a bis(3-alkoxysilylalkyl) polysulfide (e.g. bis(3-triethoxysilylpropyl) polysulfide) having an average of greater than 2.6 connecting sulfur atom in its polylsulfidic bridge;

wherein said mixing step comprises mixing said rubber composition in said internal rubber mixer to a pre-determined temperature thereof, wherein said pre-determined temperature is within a range of about 120° C. to about 190° C., alternately in a range of about 140° C. to about 180° C., and while continuing to mix said rubber composition in said mixer, mixing said rubber composition under an extended mixing condition in said internal rubber mixer at a temperature within (plus or minus) 10° C., preferably within 3° C., of said pre-determined temperature for an extended mixing period of from about 0.5 to about 15, preferably about 1 to about 5, minutes (to enable said extended mixing conditions to promote further reaction between said ethoxysilane moiety of said coupling agent and said hydroxyl groups of said silica domains on said silica-containing carbon black, and said optional synthetic precipitated silica).

In practice, the temperature of said diene-based elastomer of said rubber composition, prior to or upon introduction to said internal rubber mixer is less than about 40° C. and preferably in a range of from about 20° C. to about 40° C. Thus, as the rubber and associated ingredients are mixed within said internal rubber mixer, the temperature of the rubber composition increases to the said pre-determined temperature. Thereafter, for said extended mixing phase, it is contemplated that the rotational speed of mixing rotors contained within said internal rubber mixer is reduced by a pre-set microprocessor controlled means (apparatus) to cause the mixing temperature of the rubber composition to stabilize to a temperature within 10° C., and preferably within 3° C. of said pre-determined temperature.

In practice, said rubber composition is mixed in at least one additional, subsequent, sequential mixing step in an internal rubber mixer, exclusive of said extended mixing conditions, followed by mixing said rubber composition with an addition of free sulfur and at least one sulfur vulcanization accelerator for a period of about 1 to about 6, preferably about 1.5 to about 3, minutes to a temperature in a range of about 100° C. to about 120° C.; wherein said rubber composition is removed from said internal rubber mixer following each mixing step and cooled to a temperature below about 40° C. prior to the subsequent mixing step;

A significant aspect of this invention is the extended mixing phase for one of the mixing steps which is considered herein to be a reactive mixing step involving mixing for a period of time at the pre-determined elevated temperature (after the rubber composition autogeneously reaches the elevated mixing temperature) to promote an extended reaction between the hydroxyl groups (e.g. silanol groups) of the silica-containing carbon black and the optional synthetic silica (e.g. precipitated silica) with the ethoxysilane groups of the coupling agent to aid in promoting a coupling interaction of the coupling agent with the silica domains contained on the surface of the silica-containing carbon black during the mixing of the ingredients.

In practice, said silica domains of said composite of silica treated carbon black composite comprise at least 10 weight percent of said composite, wherein at least 50, and preferably in a range of about 50 to about 65, percent of the surface of said carbon black is covered by said domains and said silica on the surface of said carbon black contains hydroxyl groups (e.g. silanol groups) on their surfaces.

In one aspect of the invention as hereinbefore discussed, said coupling agent is preferably exclusive of bis(3-alkoxysilylalkyl) polysulfide having an average of greater than 3, and preferably greater than 2.6, connecting sulfur atoms in its polysulfidic bridge.

The silica-containing carbon black (e.g. carbon black/ silica composite) for use in this invention may be prepared, for example, by (A) co-fuming carbon black with a silica precursor of a silicon-containing material, (e.g. silica precursors such as for example at least one of silanes, silicone oil and silicates) at an elevated temperature in a manner to provide a composite of carbon black with integral discrete silicon-containing material (e.g. silica) entities, or domains, primarily on the outer surface of the carbon or by (B) co-precipitating carbon black and silica such as, for example, from a dispersion of carbon black in sodium silicate, to provide integral silica entities, or domains, on the outer surface of the carbon black.

In practice, it is considered herein that it is desired that at least 50 percent of the surface of said carbon black is covered by said silica domains in order that sufficient hydroxyl groups are made available to react with the ethoxy groups (e.g. ethoxysilane moiety) of the specified coupling agent to more effectively couple the carbon black/silica composite to the elastomers of the rubber composition. It is also desired that the majority of silica entities are presented on the surface of the carbon black/silica composite to maximize the hydroxyl groups (the silanol content) which has an effect of minimizing the specific gravity of the composite by reducing the overall silica content of the composite. In one aspect it is considered that it is desirable that said silica domains cover at least about 50, and preferably at least about 65, percent of the surface of the carbon black and the remaining amount of the carbon black surface remains uncovered by said silica domains and therefore remains available to interact with said diene-based elastomers to as a reinforcing carbon black therefor and act as a more conventional rubber reinforcing carbon black for the rubber composition.

In practice, the carbon black/silica composite used in this invention is preferably exclusive of functionalized carbon blacks, other than the aforesaid inherently present hydroxyl groups associated with the silica domains on the surface of the carbon black and other than minimal amounts of functional groups which may be normally found on the surface of rubber reinforcing carbon blacks in general.

Also, in practice, the tread rubber composition is preferably exclusive of functionalized silica other than said carbon black/silica composite.

Preferably, the carbon black/silica composite is prepared by co-fuming carbon black and a silicon-containing material (e.g. silica precursors such as, for example, silanes, silicone oil or silicates) together in order that the silica domains are integral with the surface of the carbon black to form a significant attachment for the hydroxyl groups of the silica and thereby enhance its coupling ability between the carbon black/silica composite and elastomers.

It is contemplated that the silica entities, or domains, on the surface of the carbon black of the carbon black composite are integral with the carbon black in a sense of being an actual part of the carbon black composite as compared to simple mixtures of carbon black and silica.

It is to be appreciated that the silica domains on the carbon black surface contain hydroxyl groups (e.g. silanol groups) on the surface thereof. Such hydroxyl groups are intended to be conventionally reactive with the aforesaid coupling agent.

Significantly, the silica coupler is preferably a bis(3-triethoxysilylpropyl) polysulfide which contains an average of only 2 to 2.6 sulfur atoms in its polysulfidic bridge. Such preference is intended to exclude such organosilane polysulfides which contains an average greater than 2.6 sulfur atoms in their polysulfidic bridge such as, for example tetrasulfides commercially available as Si69, a trademark of Degussa GmbH which is understood to have an average of from about 3.5 to about 4 connecting sulfur atoms in its polysulfidic bridge.

This is because, with the more limited connecting sulfur atoms (a maximum average of 2.6 connecting sulfur atoms)

in the coupling agent desired for this invention, the bonds between the sulfur are relatively stronger and therefore have a far less tendency to form, or release, free sulfur in the rubber mixture as it is being processed at elevated temperatures as compared to similar organosilane polysulfides which contain an average of at least 3.5 connecting sulfur atoms in their polysulfidic bridges. The excess in situ generated free sulfur by the silane component of the organosilane polysulfide with an average of connecting sulfur atoms in the polysulfide bridge of higher than 2.6, and particularly higher than 3.5, is unwanted herein (the non-productive mixing step) as it may tend to prematurely interact with double bonds contained in the diene-based elastomers during the mixing process and therefore to unnecessarily, and inappropriately prematurely, increase the viscosity of the rubber composition during the mixing process and is considered herein to therefor impair an efficient mixing and creation of a good dispersion of the carbon black/silica reinforcing filler within the rubber composition.

In further accordance with this invention, a rubber composition is provided which is prepared by the process of this invention.

In additional accordance with this invention, an article of manufacture is provided having at least one component comprised of such rubber composition.

In additional accordance with this invention, a tire is provided having at least one component-comprised of such rubber composition.

In additional accordance with this invention, a tire is provided having a tread comprised of such rubber composition.

It is to be appreciated that said diene-based elastomer for this invention may be selected from homopolymers and copolymers of dienes such as for, example, isoprene and 1,3 butadiene and copolymers of styrene with at least one diene selected from isoprene and 1,3-butadiene.

Representative of such elastomers are, for example, styrene/butadiene copolymers whether prepared by emulsion of organic solution polymerization, cis 1,4-polybutadiene, cis 1,4-polyisoprene whether natural or synthetic as well as minor amounts of elastomers such for example and if desired, trans 1,4-polybutadiene, isoprene/butadiene copolymers, styrene/isoprene copolymers, high vinyl polybutadiene having a vinyl content in a range of about 30 to about 90 percent and styrene/isoprene/butadiene terpolymers.

The rubber composition itself (e.g. tread rubber) can also be provided as being a sulfur cured composition through vulcanization of the uncured rubber composition (e.g. tread) tread as a component of a tire in a manner well known to those having skill in such art, usually by curing under conditions of elevated temperature and pressure in a suitable mold for a suitable period of time.

The curatives for sulfur curing the rubber composition are curatives conventionally used for sulfur curable elastomers which typically include an addition of free sulfur and one or more appropriate cure accelerators and sometimes also a retarder. Such curatives and use thereof for sulfur curable elastomer compositions are well known to those skilled in the art.

Sequential mixing processes for preparing sulfur curable rubber compositions in which elastomers and associated ingredients exclusive of addition of free sulfur and sulfur vulcanized accelerator are first mixed in one or more sequential steps, usually called a "non-productive mixing step(s)" followed by a final mixing step for adding curatives, usually called a "productive mixing step", are also well known to those skilled in the art.

It is to be appreciated that the coupling agent, if in a liquid form, might be used in conjunction with a carbon black carrier, namely, pre-mixed with a carbon black prior to the addition to the rubber composition, and such carbon black is usually to be included in the amount of carbon black accounted for in the, rubber composition formulation.

It is readily understood by those having skill in the art that the rubber composition would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

In the preparation of the rubber composition typical amounts of tackifier resins, if used, comprise about 0.5 to about 10 phr; usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others such as, for example, those disclosed in *The Vanderbilt Rubber Handbook* (1978), Pages 344 through 346. Typical amounts of antiozonants comprise about 1 to 5 phr.

Typical amounts of fatty acids, if used, which can include stearic acid, palmitic acid, linoleic acid or mixtures of one or more fatty acids, can comprise about 0.5 to about 5 phr.

Often stearic acid is used in a relatively impure state and is commonly referred to in the rubber compounding practice as "stearic acid" and is so referred to in the description and practice of this invention.

Typical amounts of zinc oxide comprise about 1 to about 5 phr. Typical amounts of waxes comprise about 1 to about 5 phr. Often microcrystalline waxes are used. Typical amounts of peptizers, if used, comprise about 0.1 to about 1 phr. Typical peptizers may be, for example, pentachlorothiophenol and dibenzamidodiphenyl disulfide.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr, with a range of from about 1 to about 2.5, sometimes from about 1 to about 2, being preferred.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 2, phr. In another embodiment, combinations of a primary and a secondary accelerator might be used with the secondary accelerator being used in amounts of about 0.05 to about 3 phr in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The presence and relative amounts of the above ingredients, other than the carbon black/silica composite and specified coupling agent are not considered to be the primary subject of this invention which is more primarily directed preparation of rubber composition via the aforesaid extended mixing process with the aforesaid silica containing carbon black/silica composite.

The ingredients are typically mixed in at least two stages, namely, at least one non-productive stage followed by a productive mix stage. The curatives (e.g. addition of free sulfur) are typically mixed in the final stage which is conventionally called the "productive" mix stage in which the mixing typically occurs at a temperature, or ultimate temperature, lower than the mix temperature(s) than the preceding non-productive mix stage(s). The rubber, carbon black and coupling agent if used, are mixed in one or more non-productive mix stages. The terms "non-productive" and "productive" mix stages are well known to those having skill in the rubber mixing art.

As hereinbefore discussed, in at least one of the non-productive mixing stages, the materials are thermomechanically mixed and the mixing temperature is allowed to reach a temperature of, for example, between about 120° C. and about 190° C., usually from about 140° C. to about 180° C. with the extended mixing being applied for the silica treated carbon black for the practice of this invention.

As hereinbefore discussed the rubber composition of this invention is used for tire treads, particularly truck tire treads, designed to be used under relatively heavy working conditions on arid off of paved roadways where heat build up and cut and chip resistance are important considerations. Such tires can be built, shaped, molded and cured by various methods which are known and will be readily apparent to those having skill in such art.

As hereinbefore discussed, the rubber composition prepared according to the process of this invention may be used, for example, as tire treads. Such tires can be built, shaped, molded and cured by various methods which are known and will be readily apparent to those having skill in such art.

While certain representative embodiments and details have been shown for the purpose of illustrating the invention, it will be apparent to those skilled in this art that various changes and modifications may be made therein without departing from the spirit or scope of the invention.

What is claimed is:

1. A process of preparing a rubber composition is comprised of at least one mixing step comprised of, based upon parts by weight per 100 parts by weight rubber (phr) mixing a rubber composition in an internal rubber mixer, wherein said rubber composition is comprised of:
   (A) at least one diene-based elastomer,
   (B) about 10 to about 200 phr of reinforcing filler composed of:
      (1) about 15 to about 100 weight percent of said filler as a composite of silica-containing carbon black having silica domains on its surface wherein said silica domains contain hydroxyl groups on their surface;
      (2) from zero to about 85 weight percent of at least one additional reinforcing filler selected from synthetic precipitated silica, which contains hydroxyl groups on the surface thereof and non-silica containing rubber reinforcing carbon black, together, and
      (3) a coupling agent comprised of a bis(3-triethoxysilylpropyl) polysulfide having an average of from 2 to 4 connecting sulfur atom in its polylsulfidic bridge;
   wherein said mixing step comprises:
      (a) mixing said rubber composition in said internal rubber mixer from a temperature of less than 40° C. to allow said rubber composition to autogeneously reach an elevated temperature within a range of about 140 to about 180° C., and:
   (b) after said rubber composition autogeneously reaches said elevated temperature, mixing said rubber composition in said internal rubber mixer at an extended mixing temperature within about 10° C. of said elevated temperature for a period of from about 0.5 to about 15 minutes to promote an extended coupling interaction of the coupling agent with the silica domains contained on the surface of the silica-containing carbon black and optional synthetic precipitated silica during the extended mixing of the ingredients;
   wherein said rubber composition is then removed from said internal rubber mixer after said mixing step and cooled to a temperature below 40° C.;
   wherein said rubber mixture is thereafter mixed in at least one additional, subsequent, sequential mixing step in an internal rubber mixer, without said extended mixing and where said rubber composition is removed from said internal rubber mixer and cooled to a temperature below about 40° C.;
   wherein said rubber mixture is thereafter mixed in an internal rubber mixer for a period of from about 1.5 to about 3 minutes to a temperature in a range of from about 100° C. to about 120° C. during which free sulfur and at least one sulfur vulcanization accelerator is added.

2. The process of claim 1 of preparing a rubber composition comprised of at least one mixing step comprised of, based upon parts by weight per 100 parts by weight rubber (phr) mixing a rubber composition in an internal rubber mixer, wherein said rubber composition is comprised of, to the exclusion of addition of free sulfur and sulfur vulcanization accelerator(s):
   (A) at least one diene-based elastomer,
   (B) about 30 to about 100 phr of reinforcing filler composed of:
      (1) about 50 to about 95 weight percent of said filler as a composite of silica-containing carbon black having silica domains on its surface wherein said silica domains contain hydroxyl groups on their surface; and,
      (2) from about 5 to about 50 weight percent of at least one of synthetic precipitated silica, which contains hydroxyl groups on the surface thereof and non-silica containing rubber reinforcing carbon black, and (3) a coupling agent as a bis(3-triethoxysilylpropyl) polysulfide having an average of from 2 to 2.6 connecting sulfur atom in its polylsulfidic bridge to the exclusion of a bis(3-trialkoxysilylalkyl) polysulfide having an average of greater than 2.6 connecting sulfur groups in its polysulfidic bridge;

wherein said mixing step comprises mixing said rubber composition in said internal rubber mixer to a pre-determined temperature thereof wherein said pre-determined temperature is within a range of about 140° C. to about 180° C., and while continuing to mix said rubber mixture in said mixer, mixing said rubber composition under an extended mixing condition in said internal rubber mixer at a temperature within about 10° C. of said pre-determined temperature for an extended mixing period of from about one to about 5 minutes.

3. The process of claim 2 wherein said additional reinforcing filler is a precipitated silica.

4. The process of claim 2 wherein said additional reinforcing filler is a non-silica containing rubber reinforcing carbon black.

5. The process of claim 2 said additional reinforcing filler is a combination of precipitated silica and non-silica containing rubber reinforcing carbon black.

6. The process of claim 1 wherein said silica-containing carbon black is prepared by:
(A) co-fuming carbon black with at least one silica precursor selected from at least one of silanes, silicone oil and silicates at an elevated temperature to provide a composite of carbon black with integral discrete silica domains primarily on the outer surface of the carbon, or by
(B) co-precipitating carbon black and silica from a dispersion of carbon black in sodium silicate, to provide integral silica domains, on the outer surface of the carbon black.

7. The process of claim 2 wherein said silica-containing carbon black is prepared by co-fuming carbon black with at least one silica precursor selected from at least one of silanes, silicone oil and silicates at an elevated temperature to provide a composite of carbon black with integral discrete silica domains primarily on the outer surface of the carbon.

8. The process of claim 2 wherein said rubber composition is exclusive of a functionalized silica other than said carbon black/silica composite.

9. The process of claim 1 wherein the temperature of said diene-based elastomer of said rubber composition, prior to or upon introduction to said internal rubber mixer is less than about 40° C.

10. The process of claim 1 wherein said rubber composition is mixed in at least one additional, subsequent, sequential mixing step in an internal rubber mixer, exclusive of said extended mixing conditions, followed by mixing said rubber composition with sulfur and at least one sulfur vulcanization accelerator for a period of about 1 to about 6 minutes to a temperature in a range of about 100° C. to about 120° C.

11. The process of claim 1 wherein said bis(3-triethoxysilyspropyl) polysulfide contains an average of from 2 to 2.6 connecting sulfur atoms in its polysulfide bridge to the exclusion of a bis(3-triethoxysilylpropyl) polysulfide having greater than an average of 3 connecting sulfur atoms in its polysulfidic bridge.

12. The process of claim 1 wherein said silica domains of said composite of silica treated carbon black comprise at least 10 percent of said composite and wherein a range of about 50 to about 65 percent of the surface of said carbon black is covered by said domains.

13. A rubber composition prepared by a process comprised of the process of claim 1.

14. A rubber composition prepared by a process comprised of the process of claim 2.

15. An article of manufacture having at least one component comprised of the rubber composition of claim 13.

16. A tire having at least one component comprised of the rubber composition of claim 13.

17. A tire having a tread comprised of the rubber composition of claim 13.

18. A tire having a tread comprised of the rubber composition of claim 14.

* * * * *